United States Patent Office 3,267,091
Patented August 16, 1966

3,267,091
COMPLEXES CONTAINING ALUMINUM, BORON AND HYDROXY ORGANIC COMPOUNDS AND PROCESS THEREFOR
Ruth C. Denison, Signal Mountain, Tenn.
(199 Lake Shore Drive, Brookfield, Conn. 06813)
No Drawing. Filed Jan. 3, 1962, Ser. No. 164,194
4 Claims. (Cl. 260—234)

This invention relates to complex chemical compounds containing aluminum, boron and certain organic radicals and to a process for producing them. This application is a continuation-in-part of my co-pending application, Serial No. 833,937, filed August 17, 1959 and now abandoned.

In accordance with the present invention, boric acid is reacted with a hydroxy compound, such as a polyhydroxy or a hydroxycarboxylic compound, to form a boric acid complex and the resultant complex is reacted with an aluminum alkoxide to form the final complex in which are linked together aluminum, boron and radicals from the aforementioned hydroxy compound.

The hydroxy compounds reacted with the boric acid may be selected from the group consisting of the following classes of substituted organic compounds:
(1) Polyhydroxy aliphatic alcohols (i.e. aliphatic polyols).
(2) Aliphatic and aromatic hydroxy acids.
(3) Polyhydroxy aromatics (i.e. aromatic polyols).
Complexes of hydroxy compounds containing up to twelve carbon atoms have been successfully prepared in accordance with the present invention.

Various proportions of the hydroxy compound and the boric acid may be employed. Thus, sufficient boric acid may be used so as to react with all the hydroxy groups present in the hydroxy compound or a lesser amount can be used down to an amount just sufficient to react with a single hydroxy group per molecule of hydroxy compound. One or more different hydroxy compounds can be employed in forming the boric acid complex.

The aluminum alkoxide can conveniently be a lower aluminum alkoxide, such as an aluminum alcoholate of methyl, ethyl, propyl, butyl or amyl alcohol. Aluminum isopropoxide has been particularly advantageous in preparing boric acid complexes without expensive heating or undue loss of boric acid.

A number of the aluminum-boric acid-hydroxy compound complexes possess mild antiseptic, antiperspirant or astringent properties. Some of the complexes are in the convenient form of powdery solids that are easily spread or dusted.

The following examples are given by way of illustrating but not limiting the invention.

*Example 1.—Dihydroxy aluminum glyceroborate*

A glycerol-boric acid complex was prepared by combining glycerol and boric acid in equi-molal proportions by digesting:

| | Parts |
|---|---|
| Glycerol | 30.7 |
| Boric acid | 20.6 | in about 100 parts hot water.
To the hot aqueous solution of the complex was added 20.4 parts of aluminum isopropoxide with vigorous stirring. The product was readily air dried to a white powder. An aqueous suspension of the product had a pH of 6.7.

*Example 1a*

Another glycerol-boric acid complex was prepared by combining the components in 2:1 molal ratio. This is accomplished by digesting:

| | Parts |
|---|---|
| Glycerol | 61.4 |
| Boric acid | 20.6 | in about 100 parts hot water.
To the hot solution of the complex was added 20.4 parts aluminum isopropoxide with vigorous stirring. The product was readily air dried to a white powder. The pH of an aqueous suspension of the product was 6.7.

*Example 2.—Dihydroxyaluminum mannitoborate*

The following components were combined:

| | Parts |
|---|---|
| Mannitol | 6.07 |
| Boric acid | 2.06 | using about 15 parts water.
To the resulting mannitoboric acid 20.4 parts aluminum isopropoxide were added with vigorous stirring. A white powder was formed which was readily air dried. The pH of an aqueous suspension of the product was 5.3.

*Example 3.—Dihydroxyaluminum gluconoborate*

A complex combining gluconic acid and boric acid in equi-molal proportions was prepared by digesting:

| | Parts |
|---|---|
| Gluconic acid | 5.97 |
| Boric acid | 2.06 | in 15 parts water.
To the complex 20.4 parts aluminum isopropoxide were added with vigorous stirring. A fine powder was formed which was air dried. The pH of an aqueous suspension of the product was 4.5.

*Example 4.—Dihydroxyaluminum glycoloborate*

A complex combining glycolic acid and boric acid in the ratio 2 mols glycolic to 1 mol boric acid was prepared by digesting:

| | Parts |
|---|---|
| Glycolic acid | 5.06 |
| Boric acid | 2.06 | in 15 parts water.
To this solution of the complex was added 20.4 parts aluminum isopropoxide with vigorous stirring. The resulting solid was air dried. The pH of an aqueous suspension of the product was 4.7.

*Example 5.—Dihydroxy aluminum lactoborate*

A complex combining lactic acid with boric acid in the ratio 2 mols lactic to 1 mol boric acid was prepared by dissolving:

| | Parts |
|---|---|
| Lactic acid | 6.0 |
| Boric acid | 2.06 | in 15 parts water.
To the solution of this complex was added 20.4 parts aluminum isopropoxide with vigorous stirring. The product was air dried to a hard cake which was easily ground to powder. An aqueous suspension of the product had a pH of 4.9.

Example 5a

A complex combining lactic acid with boric acid in the ratio 1 mol lactic to 1 mol boric acid was prepared by dissolving:

| | Parts |
|---|---|
| Lactic acid | 3.0 |
| Boric acid | 2.06 | in 15 parts water.

To the solution of this complex was added 20.4 parts aluminum isopropoxide with vigorous stirring. This was air dried and ground to form a white powder. The aqueous suspension of the product had a pH of 5.1.

Example 6.—Dihydroxyaluminum maloborate

A complex containing equi-molal amounts of malic acid and boric acid was prepared by digesting:

| | Parts |
|---|---|
| Malic acid | 4.47 |
| Boric acid | 2.06 | in 15 parts water.

To the solution of the complex was added 20.4 parts of aluminum isopropoxide with vigorous stirring. The product was air dried to a fine powder. The aqueous suspension of the product had a pH of 4.25.

Example 7.—Dihydroxyaluminum tartaroborate

A complex combining tartaric acid and boric acid in equi-molal ratio was prepared by dissolving:

| | Parts |
|---|---|
| Tartaric acid | 5.0 |
| Boric acid | 2.06 | in about 15 parts water.

To a heated solution of the complex was added 20.4 parts aluminum isopropoxide with vigorous stirring. A moist granular product which was dried in warm air was obtained. An aqueous suspension of the product had a pH of 4.0.

Example 7a

A complex combining tartaric acid and boric acid molal ratio 2:1 was prepared by dissolving:

| | Parts |
|---|---|
| Tartaric acid | 10.0 |
| Boric acid | 2.06 | in about 15 parts water.

To the solution of this complex was added 20.4 parts aluminum isopropoxide with vigorous stirring. The resulting moist granular product was air dried. An aqueous suspension of the product had a pH of 3.07.

Example 8.—Dihydroxyaluminum citroborate

A complex combining citric acid and boric acid in equi-molal ratio was prepared by dissolving:

| | Parts |
|---|---|
| Citric acid | 6.4 |
| Boric acid | 2.06 | in about 15 parts water.

To the solution of the complex was added 20.4 parts aluminum isopropoxide with vigorous stirring. The granular product was air dried. An aqueous suspension of the product had a pH of 3.2.

Example 8a

A complex combining citric acid and boric acid in 2:1 molal ratio was prepared by dissolving:

| | Parts |
|---|---|
| Citric acid | 12.8 |
| Boric acid | 2.06 | in about 15 parts water.

To the solution of the complex was added 20.4 parts aluminum isopropoxide with vigorous stirring. The product was air dried. An aqueous suspension of the product had a pH of 2.4.

Example 9.—Dihydroxyaluminum salicyloborate

A complex combining salicylic acid and boric acid in equi-molal ratio was prepared by dissolving:

| | Parts |
|---|---|
| Salicylic acid | 4.6 |
| Boric acid | 2.06 | in about 15 parts boiling water.

To the solution of the complex was added 20.4 parts aluminum isopropoxide with vigorous stirring. The resulting product was air dried. An aqueous suspension of the product had a pH of 5.0.

Example 9a

A complex combining salicylic acid and boric acid in molal ratio 2:1 is reacted with aluminum isopropoxide. An aqueous suspension of the product has a pH of 4.7.

Example 10.—Dihydroxyaluminum glycoborate

A complex combining boric acid and ethylene glycol in equi-molal ratio was prepared by dissolving:

| | Parts |
|---|---|
| Ethylene glycol | 4.14 |
| Boric acid | 4.12 | in about 22 parts water.

To the solution of the complex was added 40.8 parts aluminum isopropoxide with vigorous stirring. The resulting product was air dried. An aqueous suspension of the product had a pH of 6.6.

Example 10a

A complex combining boric acid and ethylene glycol in molal ratio 1:2 was prepared by dissolving:

| | Parts |
|---|---|
| Ethylene glycol | 8.28 |
| Boric acid | 4.12 | in about 22 parts water.

To the solution of the complex was added 40.8 parts aluminum isopropoxide with vigorous stirring. The product was air dried. An aqueous suspension of the product had a pH of 6.95.

Example 11.—Tris-dihydroxyaluminum sucro-borate

Complex sucro-borate was prepared by digesting sucrose and boric acid in equi-molar proportions in water and reacting this complex with powdered aluminum isopropoxide.

A white solid product was obtained. The pH of an aqueous suspension of this product was 5.35. This pH was attained immediately after stirring the material into distilled water (1 gm. solid plus 25 ml. water), and did not change with prolonged stirring.

When the uncombined materials which are the basic components of this compound, namely sucrose, boric acid, and aluminum hydroxide (prepared by hydrolysis of aluminum isopropoxide) were stirred in water in the same proportions as present in the compound, the pH rose gradually to 6. This pH of 6 was reached after more than an hour of stirring, and the same value was reached regardless of the order of addition of the components.

Example 12.—Tris-dihydroxyaluminum galloborate

The galloborate complex was prepared by digesting gallic acid and boric acid in equi-molar proportions, and reacting this complex with aluminum isopropoxide.

The product was solid, very slightly yellow. The pH of the aqueous suspension of this material was 5.0.

Example 13.—Tris-dihydroxyaluminum pyrogalloborate

The pyrogalloborate complex was prepared by digesting pyrogallol and boric acid in equi-molar proportions, and reacting this complex with aluminum isopropoxide. A rose-violet product (solid) was produced. The pH of an aqueous suspension of the product was 5.0.

*Example 14.—Tris-dihydroxyaluminum pyrocatecholate*

The pyrocatechol complex was prepared by digesting pyrocatechol and boric acid in equi-molar proportions, and reacting this complex with aluminum isopropoxide. The solid product was a light green color. The pH of an aqueous suspension of the product was 5.46.

The use of a minimum of water in preparing the complexes is desirable in order to obtain an end product which is readily dried. In order to dissolve the acids to form the complexes it is in some cases desirable to use an excess of water in the solution, and then to concentrate the solution of the complex by evaporating a portion of the water. The final solution should contain only a slight excess over the amount of water necessary to permit complete reaction with the aluminum isopropoxide. Other familiar methods of obtaining solution in a minimal amount of water, such as the addition of a small amount of alcohol, may be used also.

Tests were made to show that the products obtained are true compounds rather than simple mixtures of the initial components. For example, the dihydroxyaluminum glyceroborate was tested by treating it with solvents, comparing the pH of an aqueous suspension of the material with the pH of a suspension of a mixture of the components, and comparing the buffering action of the product with that of the various components.

Solvents such as ethyl alcohol which dissolve the hydroxy compound and boric acid from a mixture of the components do not remove either of these materials from the product.

The pH of an aqueous suspension of the product is different from the pH of an aqueous solution or suspension of either of the components or mixtures thereof.

| Compound: | pH |
|---|---|
| Hydrolysed aluminum isopropoxide | 7.2 |
| Dihydroxyaluminum glyceroborate | 6.7 |
| Mixture of aluminum hydroxide, glycerol and boric acid | 6.0 |

The buffering capacity of the compounds is superior to that of the components and mixtures thereof.

| Compound: | pH |
|---|---|
| Dihydroxyaluminum salicyloborate | 5.0 |
| Mixture of aluminum hydroxide, boric acid, and salicylic acid | 2.4 |

The preparation and chemical behavior of the above aluminum-boric acid-hydroxy compound complexes are compatible with the formula:

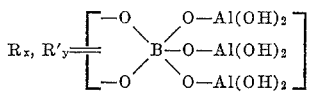

where R and R' are the radicals resulting from the removal of one or more —OH groups from the hydroxy compound and $x$ and $y$ may be 0, 1 or 2 and the sum of $x$ and $y$ is not more than 2.

It will be understood by those skilled in the art that changes and modifications may be made in the specific embodiments and examples described herein without departing from the invention and that the invention should not be limited other than by the spirit and scope of the following claims.

I claim as my invention:

1. The process which comprises forming a complex of boric acid by reacting boric acid with a hydroxy organic compound containing no more than twelve carbon atoms and selected from the group consisting of unsubstituted polyhydroxy alkyl alcohols, unsubstituted hydroxy alkyl acids, unsubstituted polyhydroxy aromatics and unsubstituted hydroxy aromatic acids, and reacting the resultant boric acid complex with a lower aluminum alkoxide.

2. The process which comprises forming a complex of boric acid by reacting boric acid with a hydroxy organic compound selected from the group consisting of glycerol, mannitol, gluconic acid, glycolic acid, lactic acid, malic acid, tartaric acid, citric acid, salicylic acid, ethylene glycol, sucrose, gallic acid, pyrogallol and pyrocatechol, and reacting the resultant complex with aluminum isopropoxide.

3. An aluminum-boric acid-organic complex of the formula

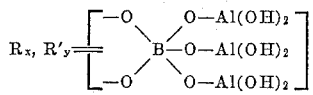

where R and R' are the radicals resulting from the removal of at least one hydroxyl group from a hydroxy compound containing no more than twelve carbon atoms and selected from the group consisting of unsubstituted polyhydroxy alkyl alcohols, unsubstituted hydroxy alkyl acids, unsubstituted polyhydroxy aromatics and unsubstituted hydroxy aromatic acids; $x$ and $y$ are integers selected from the group consisting of 0, 1, and 2.

4. An aluminum-boric acid-organic complex of the formula

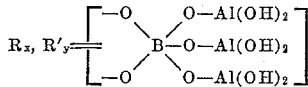

where R and R' are the radicals resulting from the removal of at least one hydroxyl group from a hydroxy compound selected from the group consisting of mannitol, gluconic acid, glycolic acid, lactic acid, malic acid, tartaric acid, citric acid, salicylic acid, ethylene glycol, sucrose, gallic acid, pyrogallol and pyrocatechol; $x$ and $y$ are integers selected from the group consisting of 0, 1, and 2.

References Cited by the Examiner

UNITED STATES PATENTS

| 2,607,658 | 8/1952 | Govett et al. | 167—90 |
| 2,645,616 | 7/1953 | Govett et al. | 167—90 |
| 2,774,792 | 12/1956 | Carlson et al. | 260—448 |

OTHER REFERENCES

Cambi: Chemical abstracts, vol. 8, page 2371 (1914).

LEWIS GOTTS, *Primary Examiner.*

A. LOUIS MONACELL, *Examiner.*

I. R. PELLMAN, J. R. GENTRY, J. R. BROWN,
*Assistant Examiners.*